US008929803B2

(12) United States Patent
Hong

(10) Patent No.: US 8,929,803 B2
(45) Date of Patent: Jan. 6, 2015

(54) RADIO FREQUENCY BARRIER IN A WIRELESS COMMUNICATION NETWORK

(75) Inventor: Deanna Hong, Palo Alto, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 294 days.

(21) Appl. No.: 13/413,694

(22) Filed: Mar. 7, 2012

(65) Prior Publication Data

US 2013/0237141 A1 Sep. 12, 2013

(51) Int. Cl.

| | |
|---|---|
| ***H04K 3/00*** | (2006.01) |
| ***H04M 1/66*** | (2006.01) |
| ***H04M 1/68*** | (2006.01) |
| ***H04M 3/16*** | (2006.01) |

(52) U.S. Cl.

USPC ................................ 455/1; 455/410; 455/411

(58) Field of Classification Search

CPC ......... H04W 4/021; H04W 3/43; H04W 3/42; H04W 1/00

USPC ............................................ 455/1, 410, 411

See application file for complete search history.

(56) References Cited

U.S. PATENT DOCUMENTS

| | | | | |
|---|---|---|---|---|
| 7,216,365 | B2 | 5/2007 | Bhagwat et al. | |
| 7,251,457 | B1 | 7/2007 | Davi | |
| 7,496,094 | B2 | 2/2009 | Gopinath et al. | |
| 7,933,611 | B2 | 4/2011 | Bocking et al. | |
| 7,948,914 | B2 | 5/2011 | Azimi et al. | |
| 7,961,886 | B2 | 6/2011 | Tiwari | |
| 8,060,939 | B2 | 11/2011 | Lynn et al. | |
| 2003/0135762 | A1 | 7/2003 | Macaulay | |
| 2004/0009768 | A1 | 1/2004 | Waters et al. | |
| 2005/0020244 | A1 * | 1/2005 | Chang et al. | 455/410 |
| 2005/0059388 | A1 | 3/2005 | Haines et al. | |
| 2005/0212673 | A1 | 9/2005 | Forster | |
| 2011/0083165 | A1 | 4/2011 | Gopinath et al. | |
| 2011/0092152 | A1 | 4/2011 | Lee et al. | |
| 2011/0183602 | A1 | 7/2011 | Tietz | |

OTHER PUBLICATIONS

IEEE Std 802.11, First edition, 1999.*

Meru Networks 'RF Barrier Secures Wireless Perimeter, Jul. 28, 2008 http://www.merunetworks.com/press-releases/2008/meru-networks-rf-barrier-secures-wireless-perimeter.html.*

International Search Report and Written Opinion in counterpart application PCT/US2013/026797 mailed May 21, 2013.

"20 Myths of Wi-Fi Interference" Cisco Systems, 2007.

* cited by examiner

*Primary Examiner* — Ping Hsieh
*Assistant Examiner* — James Yang
(74) *Attorney, Agent, or Firm* — Brian M. Mancini

(57) ABSTRACT

A method and system for a radio frequency barrier in a wireless communication network include a barrier defined for protecting a space within the wireless communication network. A plurality of antennas is located along the barrier. A radio provides radio frequency signals to transmit from the antennas to interfere with radio frequency communications impinging on the barrier. The interfering radio frequency signals can provide same channel and adjacent channel interference.

18 Claims, 5 Drawing Sheets

RADIO FREQUENCY BARRIER IN A WIRELESS COMMUNICATION NETWORK

FIELD OF THE DISCLOSURE

The present invention relates generally to wireless communication networks and more particularly to a radio frequency barrier to protect of a portion of a wireless communication network from undesired communications.

BACKGROUND

A problem that is arising in communication networks, such as an Institute of Electrical and Electronics Engineers (IEEE) 802.11 wireless local area network, is the ease with which an unauthorized or unsecured device is able to access communications in the network. In particular, radio signals emitted from an IEEE 802.11 network can be captured or disrupted by external devices outside of the network. For example, if a building contains an IEEE 802.11 network, its signals can emit past the buildings walls. Devices outside of the building can then capture these signals and gain access to network traffic. Particular examples include an IEEE 802.11 wireless sniffer placed close enough to the building to capture all network traffic, a rogue access point located outside of the building could lure mobile units inside the building to associate to it, or an IEEE 802.11 mobile unit located outside of the building could associate with IEEE 802.11 access points inside of the building and gain access to the network. Also, IEEE 802.11 jammers located outside of the build could disrupt the network signals inside of the building. Such scenarios pose a severe security threat to the wireless communication network.

Traditional methods to secure IEEE 802.11 networks can involve software methods such as encryption, authentication with credentials, or Virtual Private Networks. Also, sensors can be deployed in the network to detect threats such as rogue access points, IEEE 802.11 jammers, or unauthorized IEEE 802.11 devices trying to access the 802.11 network. However, the use of these techniques requires active monitoring of many resources that must be maintained at all times, which is a logistical problem.

Accordingly, there is a need for a simpler technique to provide a secure radio frequency environment in a wireless communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
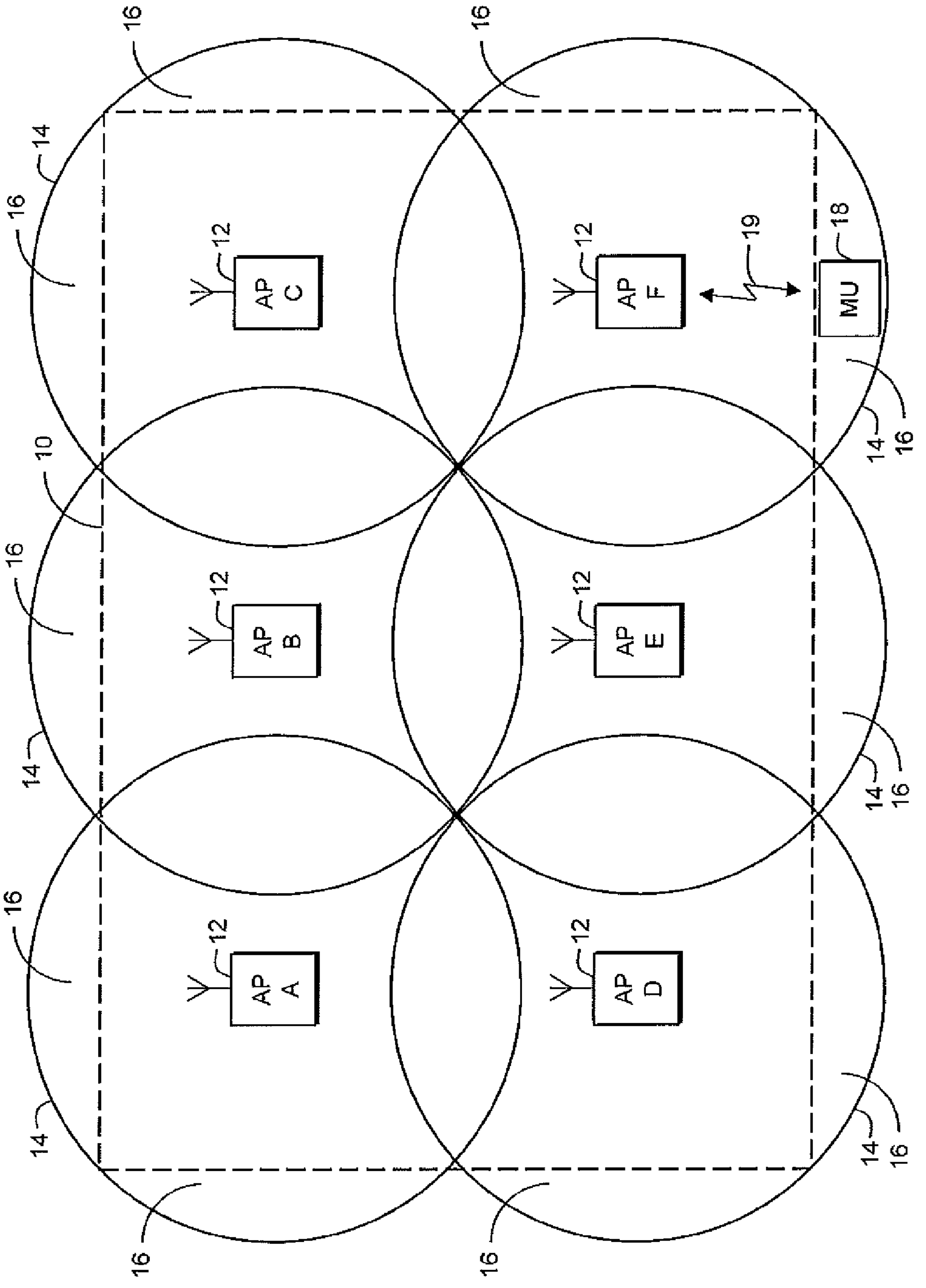
FIG. 1 is a simplified plan diagram of an unsecured system, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus and method is described that provides a secure radio frequency environment in a wireless communication network. In particular, the present invention creates radio frequency barrier in the communication network. The barrier generates IEEE 802.11 signals that will distort or disrupt any other IEEE 802.11 signals traveling through the barrier. The secure RF barrier would be placed around one or more cells of an IEEE 802.11 network to prevent IEEE 802.11 traffic from inside of the barrier leaking outside and also prevents IEEE 802.11 signals from outside of the barrier interfering or gaining access to the IEEE 802.11 network inside of the barrier. The present invention protects IEEE 802.11 traffic from outside threats and contains traffic to inside the barrier, thereby preventing any IEEE 802.11 threats from penetrating the barrier or allowing 802.11 traffic from leaking out of the barrier. The present invention does not require any active detection of unauthorized communications. In addition, the present invention does not require the deployment of intrusion detector hardware or software to find unauthorized devices.

FIG. 1 is a plan diagram depiction of a system to be protected in accordance with the present invention. A plurality of access points 12 are shown, which can support a wireless communication network, such as a wireless local area network (WLAN) for example. The wireless access points 12 provide wireless communications with terminals or mobile unit within the network. The protocols and messaging needed to establish a wireless communication network are known in the art and will not be presented here for the sake of brevity.

The wireless communication network can include local and wide-area networks, or other IEEE 802.11 wireless communication systems. However, it should be recognized that the present invention is also applicable to other wireless communication systems modified to implement embodiments of the present invention. It should be recognized that the wireless communication network can include many other network entities to provide communication services, but these entities are not shown to simplify the drawings.

The communications of devices to be protected by the present invention can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, personal computers, and personal digital assistants, and the like, all referred to herein as a mobile unit (MU).

Various entities adapted to support the inventive concepts of the embodiments of the present invention. Those skilled in the art will recognize that the figures do not depict all of the equipment necessary for network to operate but only those network components and logical entities particularly relevant to the description of embodiments herein. For example, controllers, access points, and mobile units can all includes separate processors, communication interfaces, transceivers, memories, etc. In general, components such as processors, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, or expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components. It is within the contemplation of the invention that the operating requirements of the present invention can be implemented in software in conjunction with firmware or hardware.

Referring back to FIG. 1, it is desired to protect a particular space 10 in the communication network, such as a building containing the network, distinct portions of the building, floors of the building, a set of rooms, or even individual rooms with only one access point. Of course it should be realized that the present invention is applicable to any other radio frequency environment and not just buildings. The system shown provides access points 12 with generally spherical coverage areas 14. However, it is assumed that a particular space to be protected will not correspond to these spherical coverage areas and that the access points can be detected in regions 16 outside of the space to be protected. Therefore, an unauthorized device, such a mobile unit (MU) 18, could be located within one of these "leakage" areas and perform unauthorized communications 19 with the network. Although an unauthorized mobile unit 18 is shown having communications with an authorized access point, AP F, it should be recognized that the unauthorized device could be an access point or any other radio frequency device in communication with any device of the network. For example, the device can be a network sniffer to collect leaked network traffic, a jammer to disrupt network traffic, or a rogue access point or unauthorized mobile unit to gain unsecure access to the network.

Figure 2:
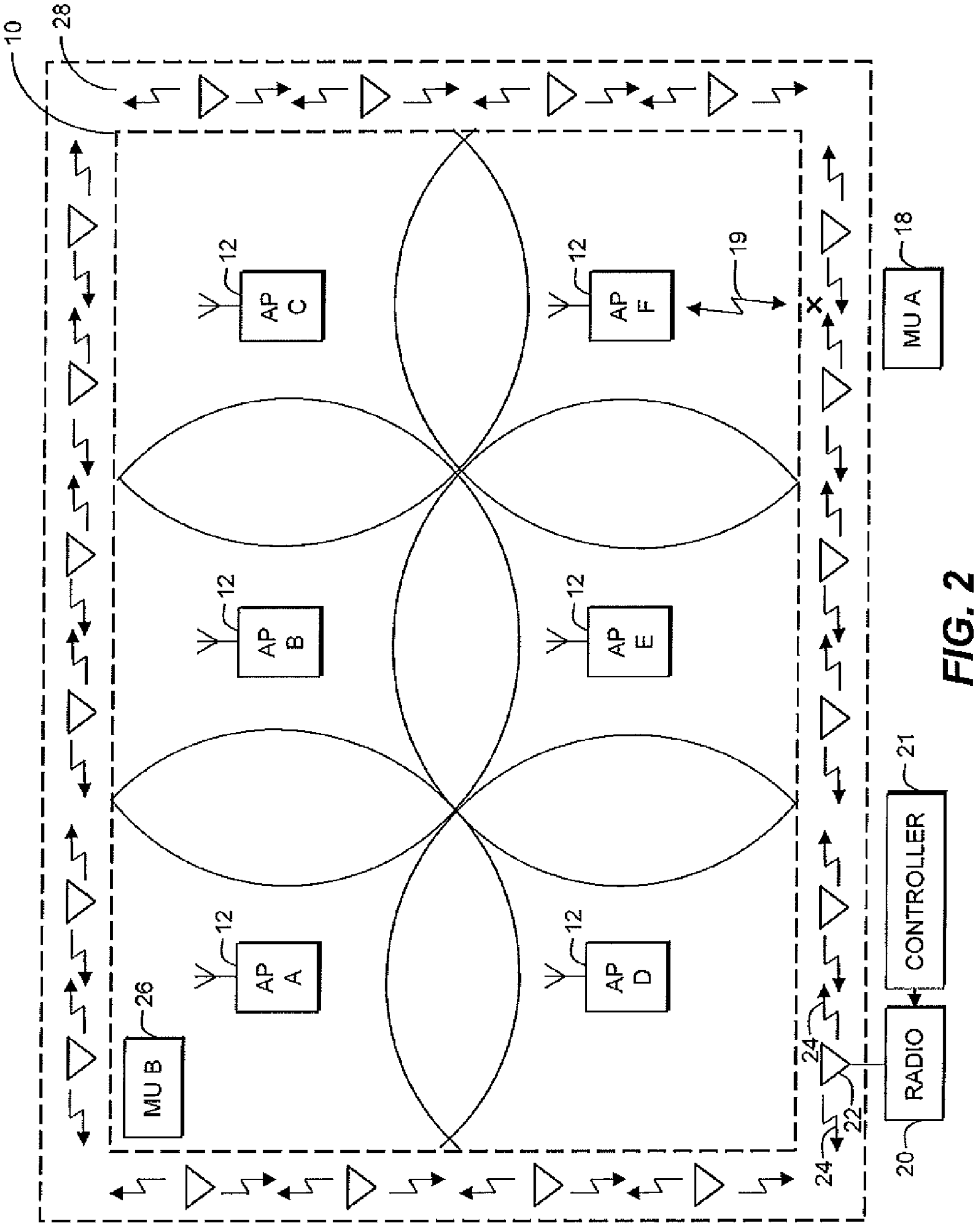
FIG. 2 is a simplified plan diagram of a secured system, in accordance with one embodiment of the present invention.

FIG. 2 shows a radio frequency barrier 28 defined for protecting the space 10, and preventing communications across the barrier, in accordance with the present invention. The barrier consists of at least one antenna, and preferably a grid of antennas 22, coupled to at least one radio 20 and located along the barrier for providing radio frequency interfering signals 24 that disrupt or distort any IEEE 802.11 signal impinging on the barrier, i.e. a signal attempting to pass through the barrier. In this example, the use of the interfering signals 24 of the barrier 28 disrupts and effectively blocks the communication 19 between the authorized device, AP F, and the unauthorized device, MU A. In practice, the interference need only be sufficient to distort the communications such that they could not be properly processed. As a result, an IEEE 802.11 sniffer outside the barrier will be unable to pickup any traffic from within the secure area, and a signals from a jammer would be effectively blocked by the distortion produced in the barrier. As a result, the present invention would prevent network traffic leakage outside of the space and prevent outside interference from entering the space.

The particular shape of the RF barrier would be based on the transmit power of the IEEE 802.11 radio(s) 20 and the position and use of the antenna(s) 22. The drawing only shows the connections and reference number labeled for one set of radio, antenna, and signals to avoid clutter in the drawing However, it should be recognized that the reference number 22, 24 applies to all antennas in the barrier 28, and that one or more radio 20 can be used to drive all the antennas 22, such as through the use of RF splitters in a higher power distributed antenna system using omnidirectional or directional antennas (as shown), or low power interlocking antenna strips or an antenna grid, for example. Directional antennas can transmit the interfering radio frequency signals directed substantially parallel to a surface of the defined barrier, thereby reducing interference for entities located farther away from the barrier. A controller 21 can be used to change the characteristics of the barrier by controlling the radio(s) 20 and antenna(s) 22. For example, the controller can change the shape and size the barrier, the timing of it use, turn portions of the barrier off/on, all in response to specific unsecure network activity to protect the space against unauthorized access.

In practice, omnidirectional or directional antennas could be use for a hotspot space to be protected. In addition, a distributed antenna system could be use to create a cost effective antenna grid, where a single radio could provide coverage across a large barrier surface. The distributed antenna system could be built into the walls, ceilings or window framing of a structure. A grid of cables, conductive sheets, or conductive paint could also be use to create the distributed antenna system.

The radio frequency distortion from the interfering signals 24 can be created in the barrier 28 in two different ways, which can be used separately or combined. First, the radio(s) could transmit constantly at low power on all channels in the IEEE 802.11 band. This provides same channel interference for any impinging signal. However, if the barrier's transmit power is too high, authorized devices, such as MU B 26, operating on one of those same channels and located near the barrier 28 would not hear a clear channel and would not be able to transmit. Therefore, the present invention would set an amplitude of the same channel interference from the interfering signals to produce interference below a clear channel assessment threshold of any device 26 within the protected space 10. Second, the radio(s) could transmit at high power on adjacent frequencies from the operating frequency to create interference. In effect, intermodulation products and noise can bleed into and provide distortions in the operating frequency. In particular, the high level of adjacent channel interference in the side frequencies would distort into the operating frequency, preventing any communications of IEEE 802.11 devices (i.e. MU A 18) located near the barrier and trying to communicate on an operating (center) frequency of a microcell from being proper processing into packets, due to the distortion or disruption provided by the adjacent frequency interference.

Figure 3:
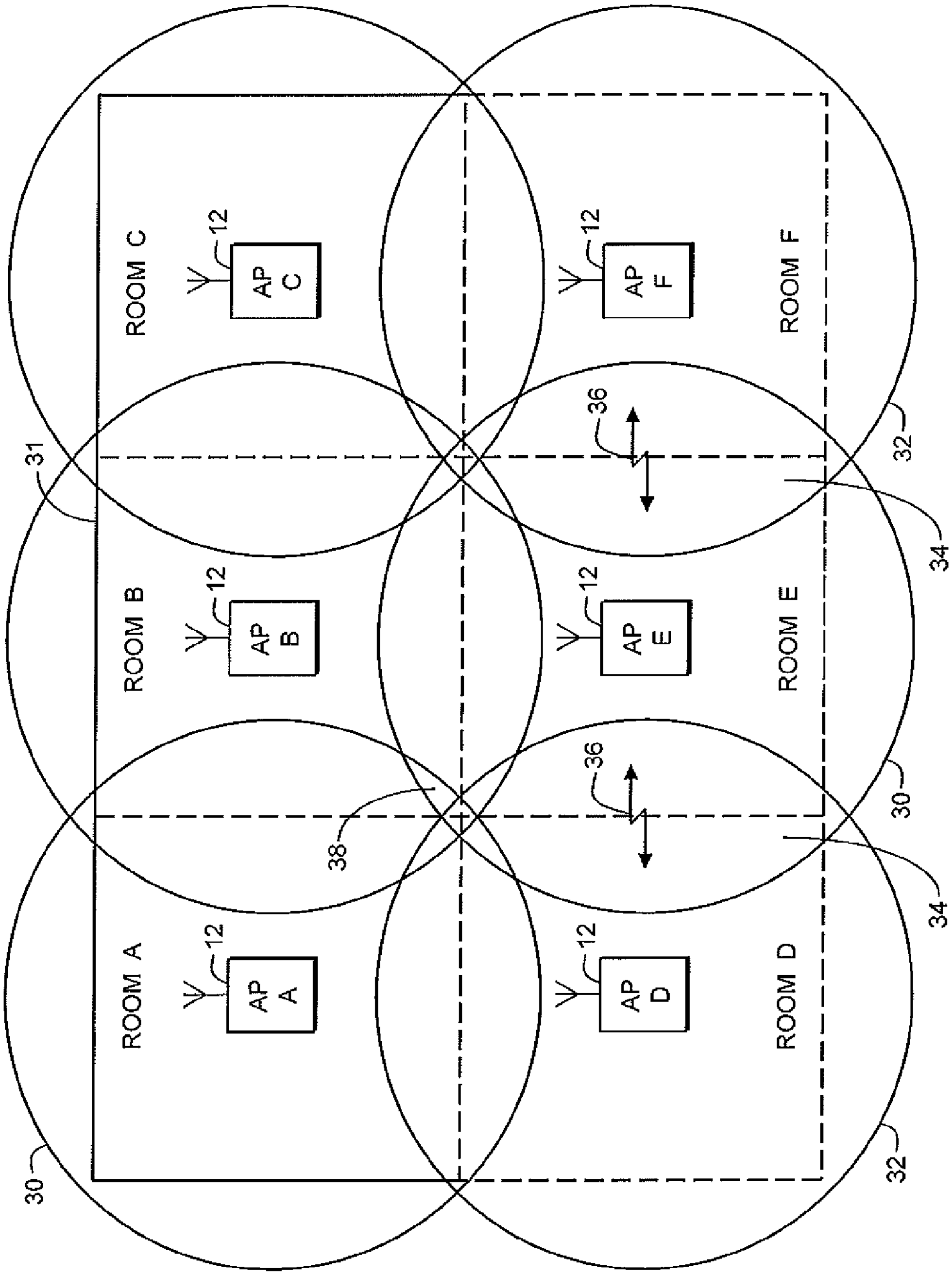
FIG. 3 is a simplified plan diagram of another unsecured system, in accordance with the present invention.

FIG. 3 illustrates another problem within a network where the present invention can be used to secure individual portions 31 of a building. In this case, the barrier can be used to protect one or more microcells of the wireless communication network, such as microcells in multiple rooms or even a single access point, AP E, within a room. In the environment shown, Room E is subject to communication leakage 36 between it and adjacent rooms, Room D and Room F due to overlapping coverage areas 34. In addition, the rooms can operate on different channels 30, 32, but due to channel reuse in the network it may be that Room E finds itself operating on a same channel 30 as a neighboring room, Room A, which can cause channel overlap 38 resulting in throughput loss. The present invention can solve these problems by providing a radio frequency barrier around Room E. Room E can then be used for secure communications, as needed.

Figure 4:
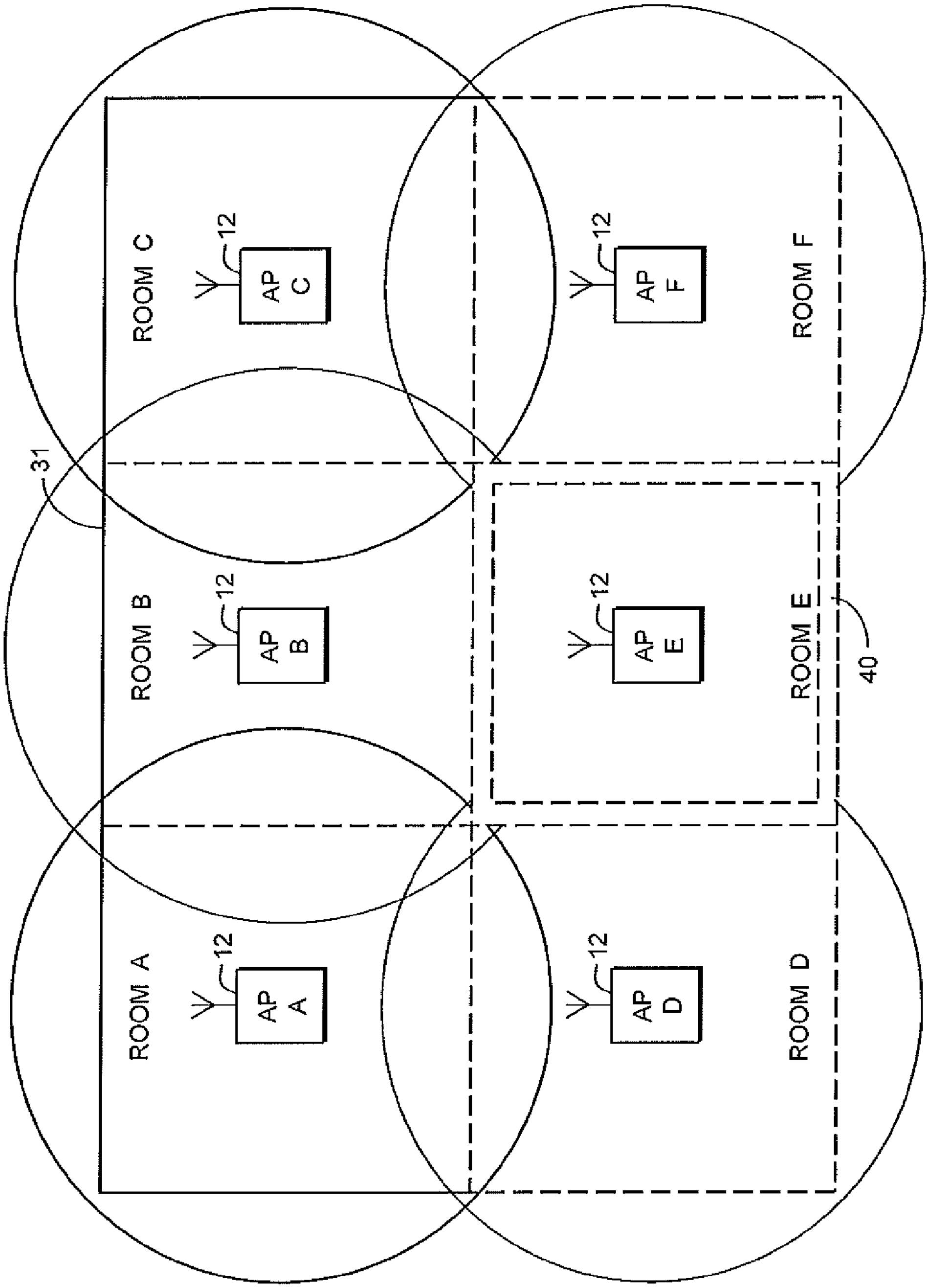
FIG. 4 is a simplified plan diagram of another secured system, in accordance with another embodiment of the present invention.

FIG. 4 shows a radio frequency barrier 40 provided for a single room, which can then be used for private communications that cannot be overheard or interfered with by other devices, even though these other devices might be authorized in the network. The barrier 40 in this example is constructed and controlled similarly to the previously described barrier (28 of FIG. 2).

Figure 5:
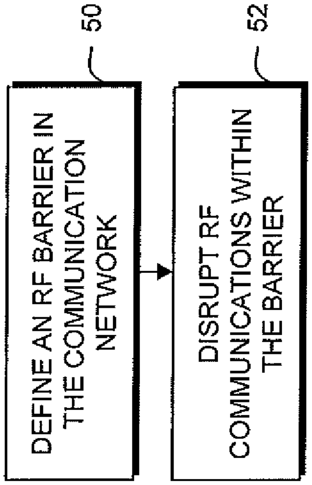
FIG. 5 is a flowchart of a method, in accordance with some embodiments of the present invention.

FIG. 5 illustrates a flowchart of a method for a radio frequency barrier in a wireless communication network, in accordance with the present invention. The method includes a first step 50 of defining a radio frequency barrier for protecting a space within the wireless communication network. The barrier can protect any portion of the network, including a single microcell in a room, for example. The space can be entirely enclosed by the barrier or the barrier can be used to complement natural or existing RF barriers such as an inaccessible roof, the ground, or a metal floor or ceiling, for example. The barrier consists of a set of antennas for transmitting radio frequency signals to interfere with the radio frequency communications impinging on the barrier, thereby preventing radio frequency communication across the barrier.

A next step 52 includes disrupting radio frequency communications impinging on the barrier by transmitting radio frequency signals to interfere with the radio frequency communications. Disrupting can be accomplished by directional antennas transmitting the interfering radio frequency signals directed substantially parallel to a surface of the defined barrier, an interlocking antenna grid transmitting the interfering radio frequency signals, or a distributed antenna system transmitting the interfering radio frequency signals.

The interfering radio frequency signals can be transmitted on a same channel as is being used within the protected space so as to provide same channel interference, and/or the radio frequency signals can be transmitted on channels adjacent to an operating (center) frequency being used within the protected space so to provide adjacent channel interference. For the same channel and adjacent channel interference, an amplitude of the interference is set to produce interference below a clear channel assessment threshold of any device within the protected space. It should also be pointed out that controlling the amplitude of the interference (both same frequency and adjacent frequency) will affect and control, and ultimately determine the final shape and size of the barrier. In practice, the interference amplitude should be controlled for same frequency interference and adjacent frequency interference so that the interference does not disrupt the receive sensitivity and capability of any device in the protected space.

Advantageously, the apparatus and method described herein enables the RF protection of a space within a wireless communication network. The present invention creating a secure IEEE 802.11 RF barrier around a building or portion of a building that prevent IEEE 802.11 radio signals inside of the building from emitting past the RF barrier and also prevents IEEE 802.11 signals outside of the building from emitting past the RF barrier to inside the building. The secure RF barrier can be scaled to small rooms or large structures. For example, conference rooms or hotel rooms can be secured from snooping and throughput could be increased by preventing adjacent or same channel interference.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for a secure radio frequency barrier for a space within a structure in a wireless communication network, the method comprising:

- defining a radio frequency barrier for protecting a space within the wireless communication network, the barrier including a set of directional antennas built into at least walls of the structure; and
- disrupting, by the antennas within the walls, all radio frequency communications impinging on the walls by transmitting interfering radio frequency signals directed substantially parallel to a surface of the walls to interfere with the impinging radio frequency communications, wherein the disrupting includes preventing radio signals within the space from leaking outside the space and radio signals outside the space are prevented from gaining access inside the space.

2. The method of claim 1, wherein the defining step includes providing an interlocking antenna grid located along the barrier, and wherein the disrupting step includes the antenna grid transmitting the interfering radio frequency signals.

3. The method of claim 1, wherein the defining step includes providing a distributed antenna system located along the barrier, and wherein the disrupting step includes the distributed antenna system transmitting the interfering radio frequency signals.

4. The method of claim 1, wherein the disrupting step includes the radio frequency signals being transmitted on a same channel as is being used within the protected space so as to provide same channel interference.

5. The method of claim 4, wherein the disrupting step includes an amplitude of the same channel interference being set to produce interference below a clear channel assessment threshold of any device within the protected space.

6. The method of claim 1, wherein the disrupting step includes the radio frequency signals being transmitted on channels adjacent at a higher power to an operating frequency being used within the protected space so to provide adjacent channel interference to disrupt communications from devices located just outside the barrier and trying to communicate on an operating frequency within the barrier.

7. The method of claim 1, wherein the disrupting step includes the radio frequency signals being transmitted on a same channel as is being used within the protected space so as to provide same channel interference and also being transmitted on channels adjacent to an operating frequency being used within the protected space so to provide adjacent channel interference to disrupt communications from devices located just outside the barrier and trying to communicate on an operating frequency within the barrier.

8. The method of claim 7, wherein the defining step includes amplitudes of the same frequency interference and adjacent frequency interference being controlled to affect a final shape of the barrier.

9. A system for providing a secure radio frequency barrier for a space within a structure in a wireless communication network, the system comprising:

- a radio frequency barrier built into at least walls of the structure and defined for protecting a space within the wireless communication network;
- at least one radio operable to provide interfering radio frequency signals for interfering with any radio frequency communications impinging on the walls;
- a plurality of directional antennas coupled to the at least one radio and being located within the walls, the antennas operable to transmit the interfering radio frequency signals from the at least one radio directed substantially parallel to a surface of the walls to interfere, within the walls, with the radio frequency communications impinging on the walls such that radio signals within the space are prevented from leaking outside the space and radio signals outside the space are prevented from gaining access inside the space.

10. The system of claim 9, wherein the plurality of antennas is an interlocking antenna grid located along the barrier, wherein the antenna grid is operable to transmit the interfering radio frequency signals.

11. The system of claim 10, wherein the plurality of antennas is a distributed antenna system located along the barrier, wherein the distributed antenna system is operable to transmit the interfering radio frequency signals.

12. The system of claim 9, wherein the radio frequency signals are transmitted on a same channel as is being used within the protected space so as to provide same channel interference.

13. The system of claim 12, wherein an amplitude of the same channel interference is set to produce interference below a clear channel assessment threshold of any device within the protected space.

14. The system of claim 9, wherein the radio frequency signals are transmitted on channels adjacent at a higher power to an operating frequency being used within the protected space so to provide adjacent channel interference to disrupt communications from devices located just outside the barrier and trying to communicate on an operating frequency within the barrier.

15. The system of claim 9, wherein the radio frequency signals are transmitted on a same channel as is being used within the protected space so as to provide same channel interference and also transmitted on channels adjacent to an operating frequency being used within the protected space so to provide adjacent channel interference to disrupt communications from devices located just outside the barrier and trying to communicate on an operating frequency within the barrier.

16. The system of claim 15, wherein amplitudes of the same frequency interference and adjacent frequency interference are controlled to affect a final shape of the barrier.

17. The system of claim 9, further comprising a controller coupled to the at least one radio, wherein the controller is operable to control the interfering radio frequency signals of the at least one radio in response to unsecure network activity.

18. The system of claim 9, wherein the at least one radio transmits constantly on all inband channels.

* * * * *